United States Patent
Wolrich et al.

(10) Patent No.: US 6,779,084 B2
(45) Date of Patent: Aug. 17, 2004

(54) ENQUEUE OPERATIONS FOR MULTI-BUFFER PACKETS

(75) Inventors: Gilbert Wolrich, Framingham, MA (US); Mark B. Rosenbluth, Uxbridge, MA (US); Debra Bernstein, Sudbury, MA (US)

(73) Assignee: Intel Corporation, Santa Clara, CA (US)

( * ) Notice: Subject to any disclaimer, the term of this patent is extended or adjusted under 35 U.S.C. 154(b) by 193 days.

(21) Appl. No.: 10/057,780

(22) Filed: Jan. 23, 2002

(65) Prior Publication Data

US 2003/0140196 A1 Jul. 24, 2003

(51) Int. Cl.[7] .............................................. G06F 12/00
(52) U.S. Cl. ........................... 711/118; 710/52; 710/54; 710/59; 711/118; 711/208
(58) Field of Search ............................ 709/238; 710/52, 710/54, 59; 711/118, 208; 370/412, 235, 428

(56) References Cited

U.S. PATENT DOCUMENTS 5,974,518 A * 10/1999 Nogradi ...................... 711/173
6,522,188 B1 * 2/2003 Poole .......................... 327/407

* cited by examiner

*Primary Examiner*—Mano Padmanabhan
*Assistant Examiner*—Mehdi Namazi
(74) *Attorney, Agent, or Firm*—Fish & Richardson P.C.

(57) ABSTRACT

The use of enqueue operations to append multi-buffer packets to the end of a queue includes receiving a request to place a string of linked buffers in a queue, specifying a first buffer in the string and a queue descriptor associated with the first buffer in the string, updating the buffer descriptor that points to the last buffer in the queue to point to the first buffer in the string, and updating a tail pointer to point to the last buffer in the string.

30 Claims, 8 Drawing Sheets

SUCCESSIVE ENQUEUE
REQUESTS TO THE
SAME QUEUE

ENQUEUE OPERATION
FOR A STRING OF
LINKED BUFFERS

ENQUEUE TAIL OPERATION AFTER AN ENQUEUE OPERATION FOR A STRING OF LINKED BUFFERS

FIG. 10

ENQUEUE OPERATIONS FOR MULTI-BUFFER PACKETS

BACKGROUND

This invention relates to enqueue operations for multi-buffer packets.

A network processor may store newly received data packets of varying sizes in memory buffers. For example, a network processor connected to a network using the Ethernet protocol may receive packets ranging in size from 64 bytes to 1500 bytes, whereas a network processor connected to a network using the SONET protocol may receive packets ranging from 40 bytes to 1500 bytes or, in some instances, jumbo packets of more than 9 kilobytes. To avoid the use of multiple buffers to store a packet, the buffer size may be set to the size of the largest possible packet that the system can handle. However, because some packets may be small compared to the maximum packet size, allocating a memory buffer that is the maximum packet size to store each data packet is not efficient.

DETAILED DESCRIPTION

Figure 1:
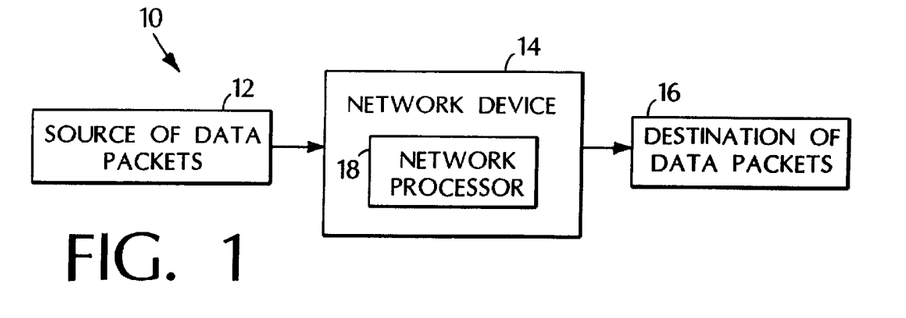
FIG. 1 illustrates a system that includes a pipelined network processor.

Referring to FIG. 1, a network system 10 for processing data packets includes a source 12 of data packets coupled to an input of a network device 14. An output of the network device 14 is coupled to a destination 16 of data packets. The network device 14 can include a network processor 18 having a memory for operating on memory data structures. The processor executes instructions and operates with the memory data structures as configured to store and forward the data packets to a specified destination. Network device 14 can include or be part of, for example, a network switch or a network router. The source of data packets 12 can include other network devices connected over a communications path operating at high data packet transfer line speeds, such as, an optical carrier 10 gigabit line (i.e., OC-192) or other line speeds. The destination 16 of data packets can include a similar network connection.

Figure 2:
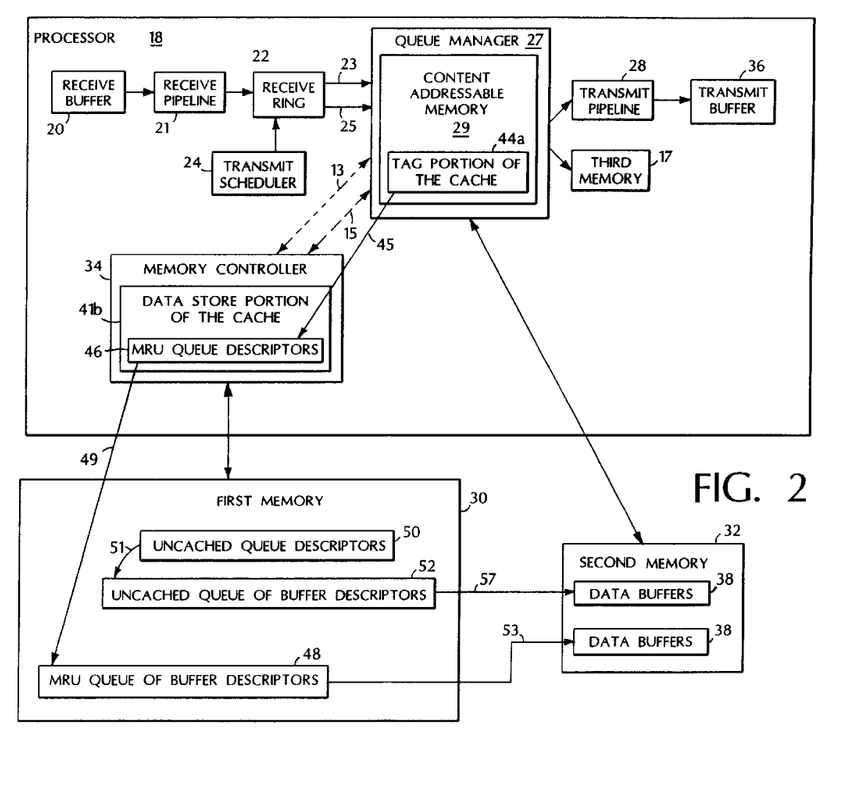
FIG. 2 illustrates details of a pipelined network processor.

Referring to FIG. 2, the network processor 18 has multiple programming engines that function, respectively, as a receive pipeline 21, a transmit scheduler 24, a queue manager 27 and a transmit pipeline 28. Each programming engine has a multiple-entry content addressable memory (CAM) to track N of the most recently used queue descriptors where N is the number of entries in the CAM. For example, the queue manager 27 includes the CAM 29. The network processor 18 includes a memory controller 34 that is coupled to a first memory 30 and second memory 32. A third memory 17 includes software instructions for causing the engines to operate as discussed in detail below. Although the present implementation uses separate memories, a single memory may be used to perform the functions of the first and second memory mentioned above. The memory controller 34 initiates queue commands in the order in which they are received and exchanges data with the queue manager 27. The first memory 30 has a memory space for storing data. The second memory 32 is coupled to the queue manager 27 and other components of the network processor 18.

As shown in FIG. 2, the first memory 30 and the second memory 32 reside externally to the network processor 18. Alternatively, the first memory 30 and/or the second memory 32 can be internal to the network processor 18. The processor 18 also includes hardware interfaces to a receive bus and a transmit bus that are coupled to receive and transmit buffers 20, 36.

The receive buffer 20 is configured to buffer data packets received from the source 12 of data packets. Each data packet can contain a real data portion representing the actual data being sent to the destination, a source data portion representing the network address of the source of the data, and a destination data portion representing the network address of the destination of the data. The receive pipeline 21 is coupled to the output of the receive buffer 20. The receive pipeline 21 also is coupled to a receive ring 22, which may have a first-in-first-out (FIFO) data structure. The receive ring 22 is coupled to the queue manager 27.

The receive pipeline 21 is configured to process the data packets from the receive buffer 20 and store the data packets in data buffers 38 in the second memory 32. The receive pipeline 21 makes requests 23 to the queue manager 27 through the receive ring 22 to append a buffer to the end of a queue.

Once the data packets are processed by the receive pipeline 21, the receive pipeline may generate enqueue requests 23 directed to the queue manager 27. The receive pipeline 21 can include multiple multi-threaded programming engines working in a pipelined manner. The engines receive packets, classify them, and store them on an output queue based on the classification. This receive processing determines an output queue for each packet. By pipelining, the programming engine can perform the first stage of execution of an instruction and, when the instruction passes to the next stage, a new instruction can be started. The processor does not have to lie idle while waiting for the first instruction to be completed. Therefore, pipelining can lead to improvements in system performance. An enqueue request represents a request to append a buffer descriptor that describes a newly received buffer to the last buffer descriptor in a queue of buffer descriptors 48 in the first memory 30. The receive pipeline 21 can buffer several packets before generating an enqueue request. Consequently, the total number of enqueue requests generated can be reduced.

The transmit scheduler 24 is coupled to the queue manager 27 through the receive ring 22 and is responsible for generating dequeue requests 25 based on specified criteria. Such criteria can include the time when the number of buffers in a particular queue of buffers reaches a predetermined level. The transmit scheduler 24 determines the order of packets to be transmitted. A dequeue request 25 represents a request to remove the first buffer from the queue 48. The transmit scheduler 24 also may include scheduling algorithms for generating dequeue requests 25 such as "round robin", priority-based or other scheduling algorithms. The transmit scheduler 24 may be configured to use congestion avoidance techniques such as random early detection (RED) which involves calculating statistics for the packet traffic. The transmit scheduler maintains a bit for each queue signifying whether the queue is empty.

The queue manager 27, which in one implementation includes, a single multi-threaded programming engine, processes enqueue requests from the receive pipeline 21 as well as dequeue requests from the transmit scheduler 24. The queue manager 27 allows for dynamic memory allocation by maintaining linked list data structures for each queue.

Figure 3:
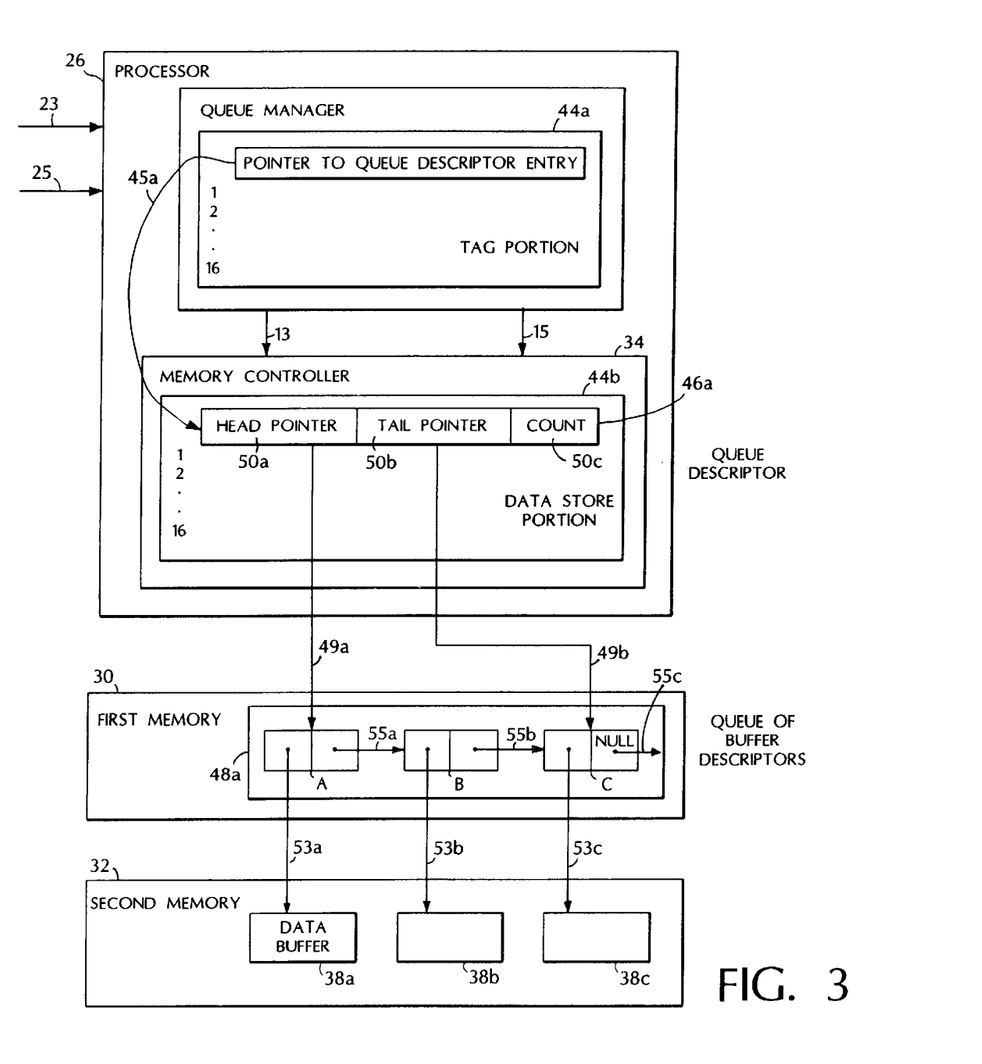
FIG. 3 is a block diagram of a cache data structure.

The queue manager 27 includes software components configured to manage a cache of data structures that describe the queues ("queue descriptors"). As shown in FIG. 3, a queue 20 descriptor 46a includes a head pointer 50a which points 49a to the first entry of a queue A, a tail pointer 50b which points 49b to the last entry C of a queue, and a count field 50c which indicates the number of entries currently on the queue. The word alignment of the address of the head pointer for all queue descriptors should be a power of two because it is more efficient to work in powers of two when accessing memory to find queue descriptors.

The cache has a tag portion 44a and a data store portion 44b. The tag portion 44a of the cache resides in the queue manager 27, and the data store portion 44b of the cache resides in the memory controller 34. The tag portion 44a is managed by the CAM 29, which can include hardware components configured to implement a cache entry replacement policy such as a least recently used (LRU) policy. The tag portion of each entry in the cache references one of the last N queue descriptors used to perform an enqueue or dequeue operation where N is the number of entries in the CAM. The queue descriptor's location in memory is stored as a CAM entry. The corresponding queue descriptor is stored in the data store portion 44b of the memory controller 34 at the address entered in the CAM. The actual data (e.g., 38a–38c) placed on the queue is stored in the second memory 32 and is referenced by the queues of buffer descriptors (e.g., 48a) located in the first memory 30.

The queue manager 27 may alternately service enqueue and dequeue requests. For single-buffer packets, an enqueue request references a tail pointer of an entry in the data store portion 44b. A dequeue request references a head pointer of an entry in the data store portion 44b. Because the cache includes valid updated queue descriptors, the need to lock access to a queue descriptor 46a can be eliminated when near simultaneous enqueue and dequeue operations to the same queue are required. Therefore, the atomic accesses and latency that accompany locking can be avoided.

The data store portion 44b maintains a list of a certain number of the most recently used (MRU) queue descriptors 46. Each queue descriptor includes pointers 50a, 50b to a corresponding MRU queue of buffer descriptors 48. In one implementation, the number of MRU queue descriptors 46 in the data store portion 44b is sixteen. Each MRU queue descriptor 46 is referenced by a set of pointers 45 residing in the tag portion 44a. In addition, each MRU queue descriptor 46 can be associated with a unique identifier so that it can be identified easily.

As shown in FIG. 3, the present technique implements a mapping between the memory address of a data structure describing each buffer (e.g., A–C) and the memory address (e.g., 38a–38c) of the buffer. The data structure describing a buffer is called a buffer descriptor, which may contain an address field, a cell count field and an end of packet (EOP) bit. The address field includes the memory address of a data buffer. Because each data buffer may be further divided into cells, the cell count field includes information about a buffer's cell count. The EOP bit is set to signify that a buffer is the last buffer in a packet.

There is an implicit mapping between the buffer descriptor addresses in a first memory 30, such as static random access memory (SRAM), and the data buffer addresses in a second memory, such as dynamic random access memory (DRAM). In this context, a queue is an ordered list of buffer descriptors describing data buffers that may be stored at discontinuous addresses. The first buffer descriptor added to a queue will be the first buffer descriptor removed from the queue. As shown, for example, in FIG. 3, each buffer descriptor A, B in a queue 48a, except the last buffer descriptor in the queue, includes a buffer descriptor pointer 55a, 55b to the next buffer descriptor in the queue. The buffer descriptor pointer 55c of the last buffer descriptor C in the queue is NULL.

Referring again to FIG. 2, the uncached queue descriptors 50 are stored in the first memory 30 and are not currently referenced by the data store portion 44b. Each uncached queue descriptor 50 also can be associated with a unique identifier. In addition, each uncached queue descriptor 50 includes pointers 51 to a corresponding uncached queue of buffer descriptors 52. In turn, each uncached queue of buffer descriptors 52 includes pointers 57 to the corresponding data buffers 38 residing in the second memory 32.

Each enqueue request includes an address of the data buffer 38 associated with the corresponding data packet. In addition, each enqueue or dequeue request includes an identifier specifying either an uncached queue descriptor 50 or a MRU queue descriptor 46 associated with the data buffer 38.

Referring to FIG. 3, the operation of the cache is illustrated. In this example, the tag portion 44a can contain up to sixteen entries. For purposes of illustration only, the following discussion focuses on the first entry in the tag portion 44a. The first entry is associated with a pointer 45a that points to a MRU queue descriptor 46a residing in the data store portion 44b. The queue descriptor 46a is associated with a MRU queue of buffer descriptors 48a. The queue descriptor 46a includes a head pointer 50a pointing 49a to the first buffer descriptor A and a tail pointer 50b pointing 49b to the last buffer descriptor C. An optional count field 50c maintains the number of buffer descriptors in the queue of buffer descriptors 48a. In this case the count field 50c is set to the value "3" representing the buffer descriptors A, B and C. As discussed in further detail below, the head pointer 50a, the tail pointer 50b and the count field 50c may be modified in response to enqueue requests and dequeue requests.

As mentioned earlier, each buffer descriptor in the queue 48a, such as the first buffer descriptor A, includes an implicit mapping 53a to a corresponding data buffer 38a in the second memory 32. Additionally, a pointer 55a in the buffer descriptor A points to the next buffer descriptor B in the queue 48a. The buffer descriptor pointer 55c associated with the last buffer descriptor C has a value set to NULL to indicate that it is the last buffer descriptor in the queue 48a.

Figure 4:
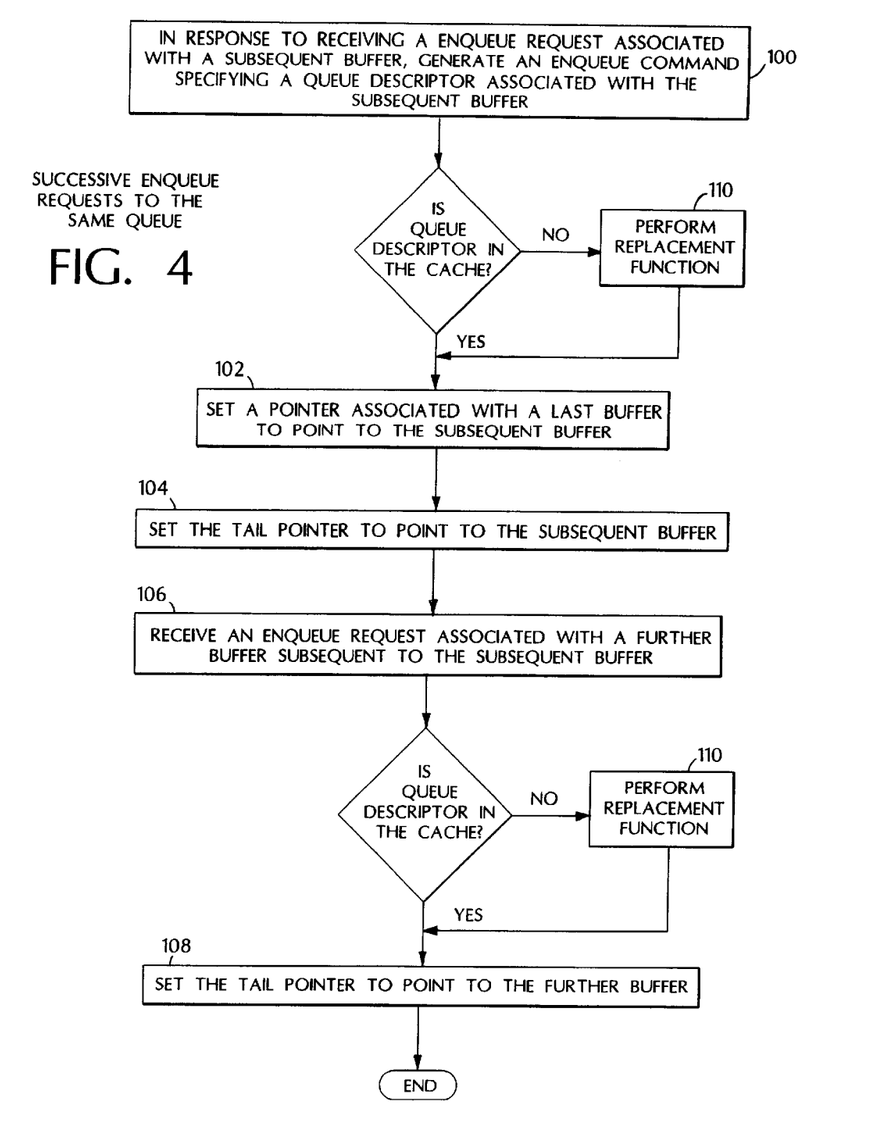
FIG. 4 is a flow chart of enqueue requests to a queue.
Figure 5:
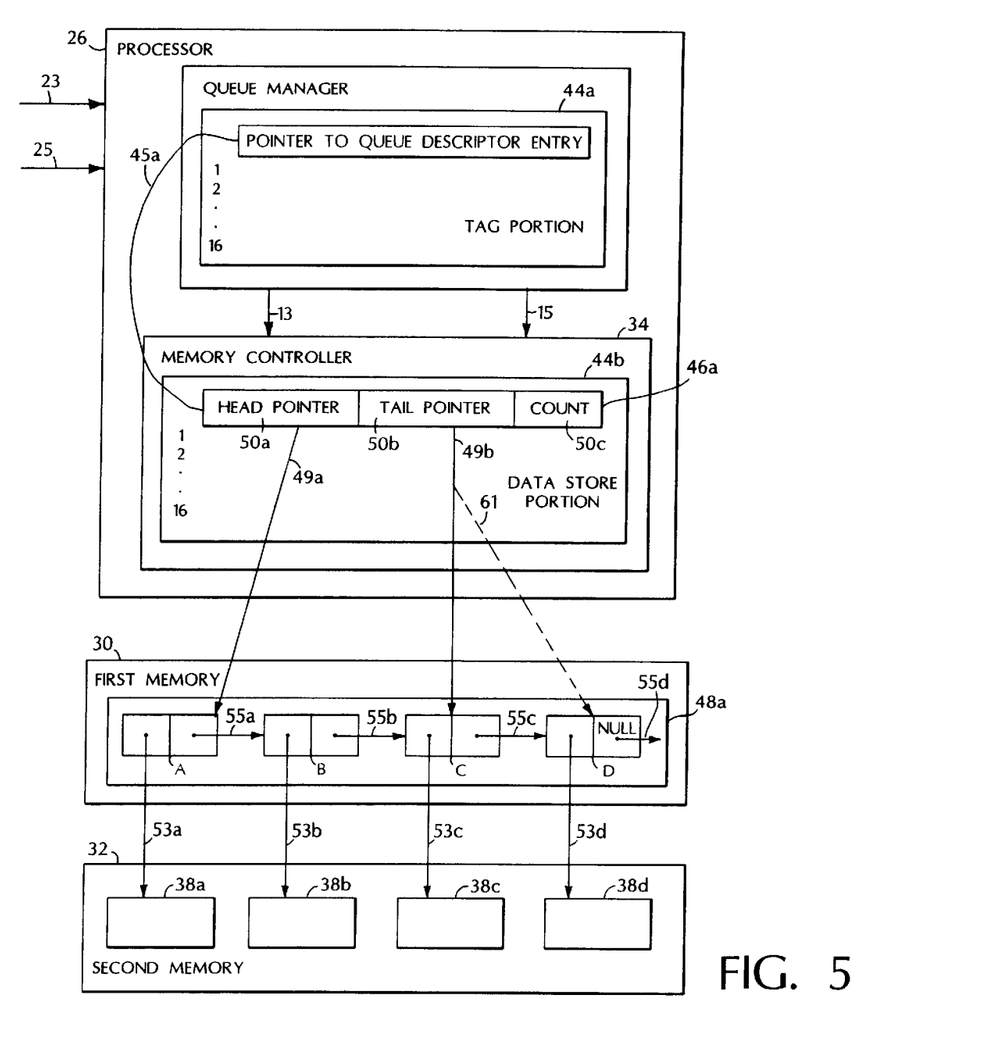
FIG. 5 is a block diagram showing an enqueue operation.

Referring to FIGS. 4 and 5, in response to the receiving an enqueue request 23, the queue manager 27 generates 100 an enqueue command 13 directed to the memory controller 34. In the illustrated example, the enqueue request 23 is associated with a subsequent data buffer 38d received after data buffer 38c. The enqueue command 13 may include information specifying a MRU queue descriptor 46 residing in the data store portion 44b. It is assumed that the enqueue request 23 includes information specifying the queue descriptor 46a and an address associated with the data buffer 38d. The tail pointer 50b currently pointing 49b to buffer descriptor C in the queue 48a is returned to the queue manager 27. The enqueue request 23 is evaluated to determine whether the specified queue descriptor is currently in the data store portion 44b. If it is not, then a replacement function is performed 110. The replacement function is discussed further below.

The buffer descriptor pointer 55c associated with buffer descriptor C is changed from a NULL value and is set 102 to point to the subsequent buffer descriptor D. That is accomplished by setting the buffer descriptor pointer 55c to the address of the buffer descriptor D, which points 53d to data buffer 38d that stores the received data packet.

Once the buffer descriptor pointer 55c has been set, the tail pointer 50b is set 104 to point to buffer descriptor D as indicated by dashed line 61. That is accomplished by setting the tail pointer 50b to the address of the buffer descriptor D. Since buffer descriptor D is now the last buffer descriptor in the queue 48a, the value of the buffer descriptor pointer 55d is NULL. Moreover, the value in the count field 49c is updated to "4" to reflect the number of buffer descriptors in the queue 48a. As a result, the buffer descriptor D is added to the queue 48a by using the queue descriptor 46a residing in the data store portion 44b.

If the enqueue command 13 includes a queue identifier specifying a queue descriptor which is not among the MRU queue descriptors 46, the queue manager 27 replaces a particular MRU queue descriptor 46 with the specified queue descriptor. As a result, the specified queue descriptor and the corresponding uncached queue of buffer descriptors are referenced by the data store portion 44b. In addition, for an enqueue command, the newly referenced queue of buffer descriptors 52 associated with the specified queue descriptor is updated to point to the particular data buffer 38 storing the received data packet. The MRU queue descriptor 46 can now be updated quickly and efficiently because the queue descriptor is already in the data store portion 44b.

Figure 6:
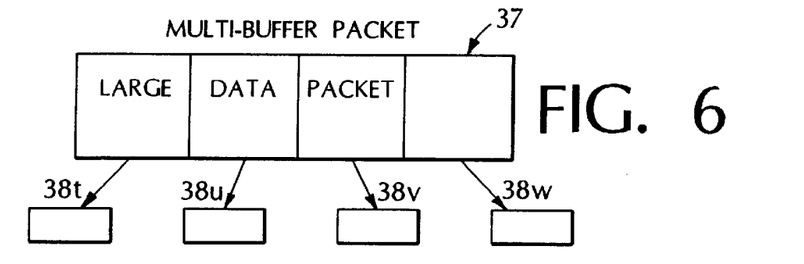
FIG. 6 illustrates a multi-buffer packet.

Referring to FIG. 6, as shown, multiple data buffers 38t–38w may represent a data packet processed by the receive buffer 20. In addition to individual buffers, a string of linked buffers also may be the object of a queue operation. A string of linked buffers can be used when a data packet 37 is too large to fit in a single buffer as shown in FIG. 6.

Figure 7:
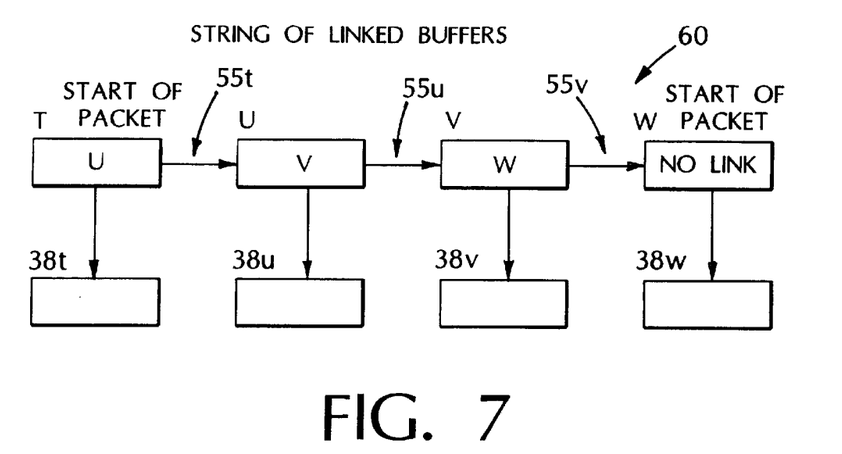
FIG. 7 is a block diagram of a string of linked buffers.

Referring to FIG. 7, each buffer descriptor T–W in the string of buffer descriptors includes a pointer to the next buffer descriptor in the string. The last buffer W in the string includes a NULL pointer field. Because of the implicit mapping between buffer descriptor addresses and data buffer addresses, essentially a string of linked buffers is formed.

A previously linked string 60 of buffer descriptors that describe a newly received string of linked buffers, respectively, can be appended to the last buffer descriptor in a queue of buffer descriptors 48a by issuing an enqueue command 23 followed by an enqueue tail command 24, as explained below. In addition to handling enqueue and dequeue requests, the queue manager 27 also may handle enqueue tail requests from the receive pipeline in a similar manner. An enqueue tail request is made with respect to the address of the last buffer descriptor in a queue of buffer descriptors and represents a request to update a tail pointer of a queue descriptor to point to that last buffer descriptor. The enqueue tail command 24 may include information specifying a MRU queue descriptor 46 residing in the data store portion 44b. In that case, the MRU queue descriptor is updated so that the pointer points 49 to the last buffer descriptor in the MRU queue of buffer descriptors 48.

Figure 8:
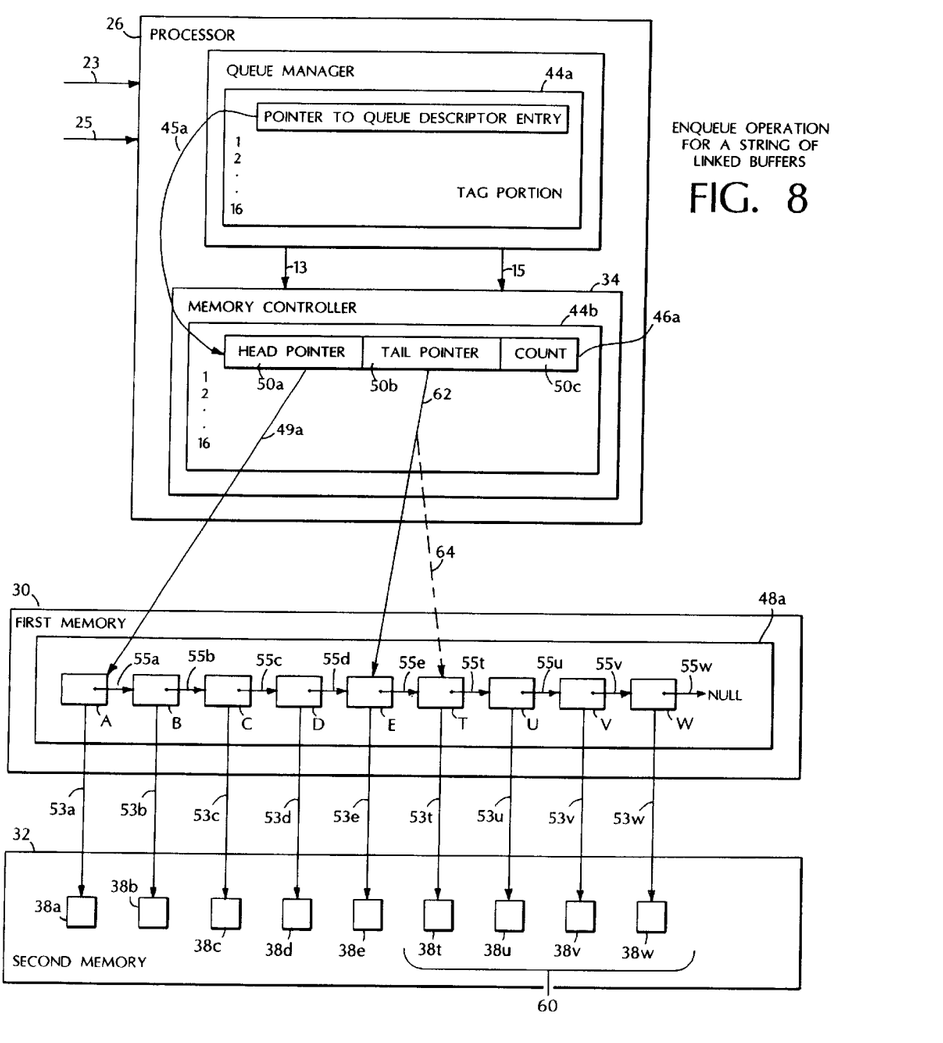
FIG. 8 is a diagram showing an enqueue operation for a string of linked buffers.

Referring to FIG. 8, a queue of buffer descriptors 48a is stored in the first memory, such as SRAM. There is an implicit mapping (53a–53w) between the buffer descriptors (A–W) and the actual data buffers (38a–38w) stored in the second memory, such as DRAM. In response to receiving an enqueue request 23 from the receive pipeline with respect to a first buffer 38t of a string of linked buffers, a thread of the queue manager generates an enqueue command 13 directed to the memory controller 34. In the illustrated example, the enqueue request 23 is associated with a subsequent data buffer 38t received after data buffer 38e. The enqueue request 23 includes information specifying the queue descriptor 46a and an address associated with the first data buffer 38t in a string of linked buffers 60. The queue descriptor 46a may be specified as an entry in the cache in the memory controller 46a in the third memory. The string of linked buffers 60 resides the second memory.

Initially, it is assumed that the buffer descriptor pointer 55e associated with buffer descriptor E has a NULL value indicating that it is the last buffer descriptor in the queue 48a. The buffer descriptor pointer 55e of the last buffer descriptor E in the queue is updated to point to the subsequent first buffer descriptor T in the string of linked buffer descriptors T–W to be added. That is accomplished by setting the buffer descriptor pointer 55e to the address of the first buffer descriptor in the link of buffer descriptors to be added. The tail pointer 50b currently pointing 62 to buffer descriptor E in the queue 48a is returned to the queue manager 27. The enqueue request 23 is evaluated to determine whether the queue descriptor associated with the enqueue request is currently in the data store portion 44b. If it is not, then the replacement function is performed. The tail pointer 50b, which used to point to buffer descriptor E (as indicated by line 62) is set to point to buffer descriptor T as indicated by dashed line 64. This may be accomplished by setting the tail pointer 50b to the address of the buffer descriptor T.

Because buffer descriptor W is the last buffer descriptor in the queue 48a, the value of the buffer descriptor pointer 55w is NULL. Moreover, the value in the count field 50c is updated to "6" to reflect the number of buffer descriptors in the queue 48a. The string of linked buffer descriptors T–W is counted as one item. As a result, the buffer descriptor T is added to the queue 48a by using the queue descriptor 46a residing in the data store portion 44b. At this point, the queue 48a has a link from the buffer descriptor E to the first descriptor T in the string of buffer descriptors T–W.

To execute an enqueue tail command, the specified queue descriptor 46a is updated so that the tail pointer 50b points to the last buffer descriptor W in the corresponding queue 48a of buffer descriptors.

Figure 9:
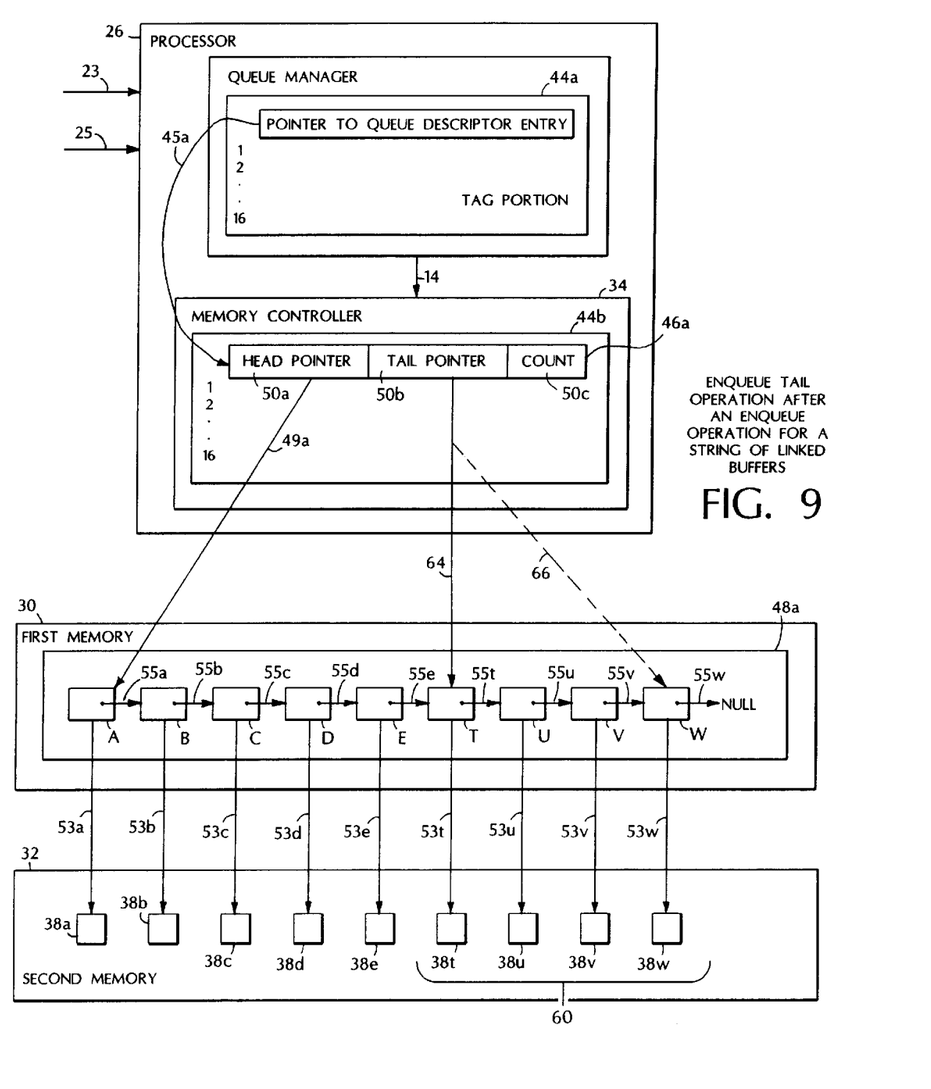
FIG. 9 is a diagram illustrating an enqueue tail operation for a string of linked buffers.
Figure 10:
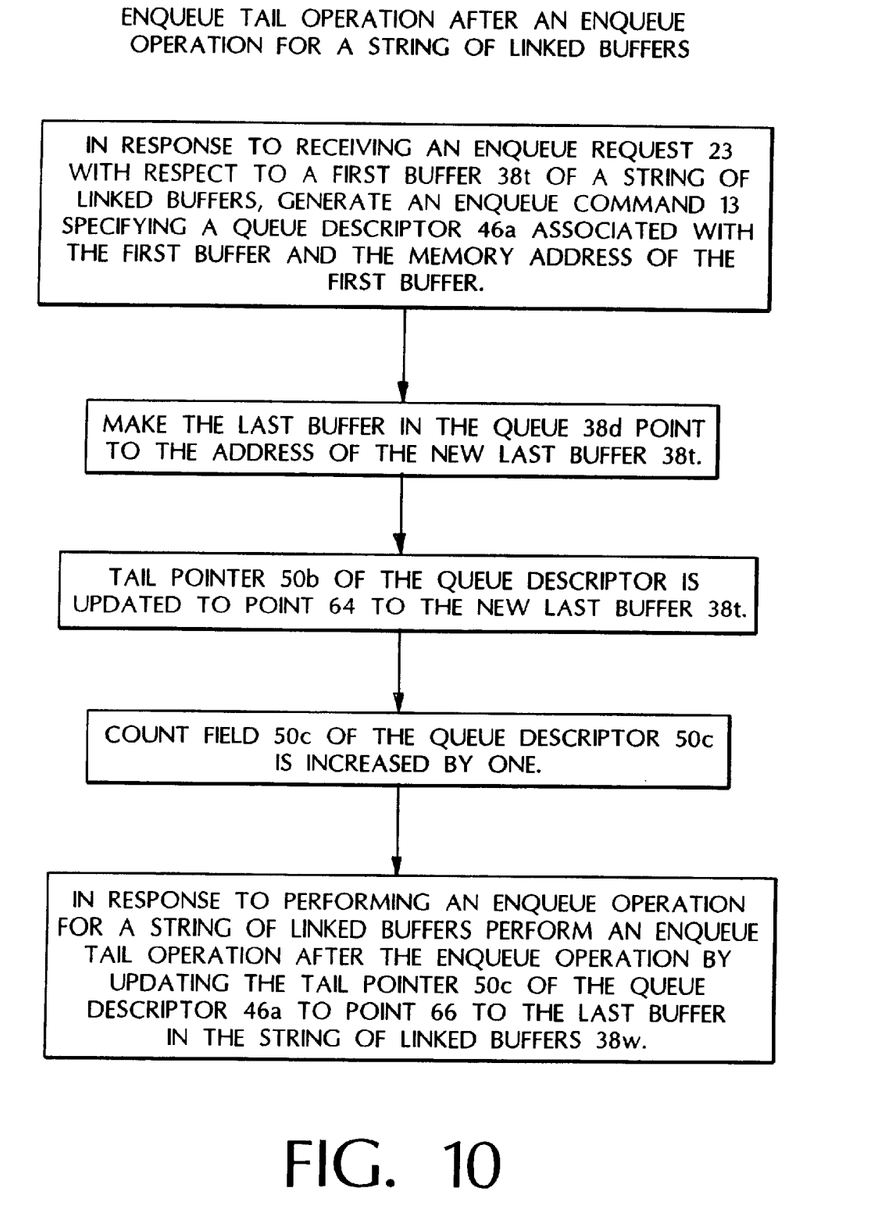
FIG. 10 is a flow chart of an enqueue tail operation.

Referring to FIGS. 9 and 10, in response to receiving an enqueue tail request 24 from the receive pipeline 21 with respect to a last buffer 38w of a string 60 of linked buffers, the queue manager 27 generates an enqueue tail command 14. This command should follow the enqueue command 13 issued by the queue manager 27 and should be issued by the same thread of the queue manager. The enqueue tail command 14 includes information specifying the queue descriptor 46a and the memory address of the last buffer 38w of the string 60 of linked buffers. The queue descriptor 46a may be specified as an entry in the cache in the memory controller 34.

The tail pointer 50b initially pointing to buffer descriptor T (as indicated by line 64) is returned to the queue manager 27. The enqueue tail request 24 is evaluated to determine whether the queue descriptor 46a associated with the enqueue tail request is currently in the data store portion 44b. If it is not, then the replacement function is performed. The tail pointer 50b is set to point to buffer descriptor W as indicated by dashed line 66. That may be accomplished by setting the tail pointer 50b to the address of the buffer descriptor W. In summary, the enqueue tail command updates the tail pointer 50b of the queue descriptor 46a to point to the buffer descriptor W of the last buffer 38w in the string 60 of linked buffers.

Another thread of the queue manager 27 then can issue another enqueue command with respect to a single buffer or a multi-buffer to the same queue.

The present technique can provide an efficient mechanism to perform enqueue operations with respect to multi-buffer packets because it may reduce the number of links maintained by buffers in a string of linked buffers and the buffer descriptors that describe them. For example, a buffer in a link of buffers comprising a data packet may not have to include a pointer to the next data packet.

Various modifications may be made to the foregoing techniques. For example, there need not be an implicit mapping between the buffer descriptors and the data buffers. In that case the queue descriptor 46a may point to a queue that includes the data buffers rather than the buffer descriptors. Other implementations are within the scope of the following claims.

What is claimed is:

1. A method of managing the queue, the method comprising:

receiving a request to place a string of linked buffers in a queue, each buffer storing information describing a portion of a data packet;

specifying an address that stores information describing a structure of the queue, and a memory address of a first buffer in the string;

updating a first buffer descriptor that points to a memory address storing a last buffer in the queue to point to a second buffer descriptor that points to a memory address storing a first buffer in the string; and updating a tail pointer in the information describing the structure of the queue to point to a memory address storing the buffer descriptor that points to a last buffer in the string.

2. The method of claim 1 further comprising incrementing the count field in the information describing a structure of the queue by one when the string of linked buffers is added to the queue.

3. The method of claim 1 further comprising:

updating the tail pointer in said information to point to a memory address storing a buffer descriptor that points to the first buffer in the string, prior to updating the tail pointer to point to the memory address storing a buffer descriptor that points to the last buffer in the string.

4. The method of claim 3 where updating includes:

generating a first command that specifies an address storing information describing a structure of a queue associated with the first buffer in a string of linked buffers and that specifies a memory address of the first buffer in the string; and generating a second command that specifies an address storing information describing a structure of a queue associated with the last buffer and the memory address of the last buffer in the string of linked buffers.

5. The method of claim 1 further comprising:

storing a buffer descriptor and a data buffer in a first memory.

6. An apparatus comprising:

a processor;

a first memory to store a queue buffer descriptors and buffers;

a cache memory to store information describing a structure of the queue; and a third memory to store instructions that, when applied to the processor, cause the processor to:

specify an address that stores information describing the structure of the queue and a memory address of a first buffer in a string of linked buffers in response to receiving a request to place the string of linked buffers in the queue, each buffer storing information describing a portion of a data packet;

subsequently update a first buffer descriptor that points to a memory address storing a last buffer in the queue to point to a second buffer descriptor that points to a memory address storing a first buffer in the string; and subsequently update a tail pointer in the information describing the structure of the queue to point to a memory address storing a buffer descriptor that points to a last buffer in the string.

7. The apparatus of claim 6 wherein the third memory further includes instructions to cause the processor to:

increment the count field in the information describing a structure of the queue by one when the string of linked buffers is added to the queue.

8. The apparatus of claim 6 wherein the third memory further includes instructions to cause the processor to:

update the tail pointer in said information to point to a memory address storing a buffer descriptor that points to the first buffer in the string, prior to updating the tail pointer to point to the memory address storing a buffer descriptor that points to the last buffer in the string.

9. A system comprising:

a source of data packets;

a destination of data packets; and a device operating to transfer data packets from the source to the destination comprising:

a processor;

a first memory to store a queue of buffer descriptors and buffers;

a cache memory to store information describing a structure of the queue; and a third memory to store instructions that, when applied to the processor, cause the processor to:

specify an address that stores information describing the structure of the queue and a memory address of a first buffer in a string of linked buffers in response to receiving a request to place the string of linked buffers in the queue, each buffer storing information describing a portion of a data packet;

subsequently update a first buffer descriptor that points to a memory address storing a last buffer in the queue to point to a second buffer descriptor that points to a memory address storing a first buffer in the string; and subsequently update a tail pointer in the information describing the structure of the queue to point to a memory address storing a buffer descriptor that points to a last buffer in the string.

10. The system of claim 9 wherein the third memory further includes instructions to cause the processor to:

increment the count field in the information describing a structure of the queue by one when the string of linked buffers is added to the queue.

11. The system of claim 9 wherein the third memory further includes instructions to cause the processor to:

update the tail pointer in said information to point to a memory address storing a buffer descriptor that points to the first buffer in the string, prior to updating the tail pointer to point to the memory address storing a buffer descriptor that points to a last buffer in the string.

12. An article comprising a computer-readable medium including computer-readable instructions that, when applied to a computer system, cause the computer system to:

specify an address that stores information describing a structure of a queue and a memory address of a first buffer in a string of linked buffers in response to receiving a request to place the string of linked buffers in the queue, each buffer storing information describing a portion of a data packet;

subsequently update a first buffer descriptor that points to a memory address storing a last buffer in the queue to point to a second buffer descriptor that points to a memory address storing a first buffer in the string; and subsequently update a tail pointer in the information describing the structure of the queue to point to a memory address storing a buffer descriptor that points to the last buffer in the string.

13. The article of claim 12 including instructions that cause the computer system to:

increment the count field in the information describing a structure of the queue by one when the string of linked buffers is added to the queue.

14. The article of claim 12 including instructions that cause the computer system to:

update the tail pointer in said information to point to a memory address storing the buffer descriptor that points to the first buffer in the string, prior to updating the tail pointer to point to the memory address storing the buffer descriptor that points to the last buffer in the string.

15. The article of claim 12 including instructions that cause the computer system to:

generate a first command that specifies an address storing information describing a structure of a queue associated with the first buffer in a string of linked buffers and that specifies the memory address of the first buffer in the string; and generate a second command that specifies an address storing information describing a structure of a queue associated with the last buffer in a string of linked buffers and the memory address of the last buffer in the string of linked buffers.

16. A method of managing a queue, the method comprising:

receiving a request to place a string of linked buffers in a queue, each buffer storing information describing a portion of a data packet;

specifying an address that stores information describing a structure of the queue, and a memory address of a first buffer in the string;

updating a buffer pointer of a last buffer in the queue to point to a memory address storing a first buffer in the string; and updating a tail pointer in the information describing the structure of the queue to point to a memory address storing a last buffer in the string.

17. The method of claim 16 further comprising incrementing the count field in the information describing a structure of the queue by one when the string of buffers is added to the queue.

18. The method of claim 16 further comprising:

updating the tail pointer in said information to point to a memory address storing the first buffer in the string, prior to updating the tail pointer to point to the memory address storing the last buffer in the string.

19. The method of claim 18 where updating includes:

generating a first command that specifies an address storing information describing a structure of a queue associated with the first buffer in a string of linked buffers and that specifies a memory address of the first buffer in the string; and generating a second command that specifies an address storing information describing a structure of a queue associated with the last buffer and the memory address of the last buffer in the string of linked buffers.

20. The method of claim 16 further comprising storing a data buffer in a first memory.

21. An apparatus comprising:

a processor;

a first memory to store buffers;

a cache memory to store information describing a structure of a queue; and a third memory to store instructions that, when applied to the processor, cause the processor to:

specify an address that stores information describing the structure of the queue and a memory address of a first buffer in a string of linked buffers in response to receiving a request to place a string of linked buffers in the queue, each buffer storing information describing a portion of a data packet;

subsequently update a buffer pointer of a last buffer in the queue to point to a memory address storing a first buffer in the string; and subsequently update a tail pointer in the information describing the structure of the queue to point to a memory address storing a last buffer in the string.

22. The apparatus of claim 21 wherein the third memory further includes instructions to cause the processor to:

increment the count field in the information describing a structure of the queue by one when the string of linked buffers is added to the queue.

23. The apparatus of claim 21 wherein the third memory further includes instructions to cause the processor to:

update the tail pointer in said information to point to a memory address storing a first buffer in the string, prior to updating the tail pointer to point to the memory address storing a last buffer in the string.

24. A system comprising:

a source of data packets;

a destination of data packets; and a device operating to transfer data packets from the source to the destination comprising:

a processor;

a first memory to store buffers;

a cache memory to store information describing a structure of a queue; and a third memory to store instructions that, when applied to the processor, cause the processor to:

specify an address that stores information describing the structure of the queue and a memory address of a first buffer in a string of linked buffers in response to receiving a request to place the string of linked buffers in the queue, each buffer storing information describing a portion of a data packet;

subsequently update a buffer pointer of a last buffer in the queue to point to a first buffer in the string; and subsequently update a tail pointer in the information describing the structure of the queue to point to a memory address storing a last buffer in the string.

25. The system of claim 24 wherein the third memory further includes instructions to cause the processor to:

increment the count field in the structure of the queue by one when the string of linked buffers is added to the queue.

26. The system of claim 24 wherein the third memory further includes instructions to cause the processor to:

update the tail pointer in said information to point to a memory address storing a first buffer in the string, prior to updating the tail pointer to point to the memory address storing a last buffer in the string.

27. An article comprising a computer-readable medium including computer-readable instructions that, when applied to a computer system, cause the computer system to:

specify an address that stores information describing a structure of a queue and a memory address of a first buffer in a string of linked buffers in response to receiving a request to place the string of linked buffers in the queue, each buffer storing information describing a portion of a data packet;

subsequently update a buffer pointer of a last buffer in the queue to point to a memory address storing the first buffer in the string; and subsequently update a tail pointer in the information describing the structure of the queue to point to a memory address storing the last buffer in the string.

28. The article of claim 27 including instructions that cause the computer system to:

increment the count field in the information describing a structure of the queue by one when the string of linked buffers is added to the queue.

29. The article of claim 27 including instructions that cause the computer system to:

update the tail pointer in said information to point to a memory address storing the first buffer in the string, prior to updating the tail pointer to point to the memory address storing the last buffer in the string.

30. The article of claim 29 including instructions that cause the computer system to:

generate a first command that specifies an address storing information describing a structure of a queue associated with the first buffer in a string of linked buffers and that specifies a memory address of the first buffer in the string; and generate a second command that specifies an address storing information describing a structure of a queue associated with the last buffer in a string of linked buffers and the memory address of the last buffer in the string of linked buffers.

* * * * *